(12) United States Patent
He

(10) Patent No.: US 6,263,921 B1
(45) Date of Patent: Jul. 24, 2001

(54) COMPOSITE PLASTIC PIPE WITH NETTED STEEL WIRE SKELETON AND METHOD AND DEVICE FOR FABRICATING THE SAME

(76) Inventor: Yiliang He, No. 154 Xuanhua St., Nagnang District, Harbin City, Heilongjiang Province 150001 (CN)

( * ) Notice: Subject to any disclaimer, the term of this patent is extended or adjusted under 35 U.S.C. 154(b) by 0 days.

(21) Appl. No.: 09/331,175

(22) PCT Filed: Jul. 13, 1998

(86) PCT No.: PCT/CN98/00124

§ 371 Date: Jun. 22, 1999

§ 102(e) Date: Jun. 22, 1999

(87) PCT Pub. No.: WO00/04315

PCT Pub. Date: Jan. 27, 2000

(51) Int. Cl.[7] .................................................. F16L 9/128
(52) U.S. Cl. ........................ 138/174; 138/172; 138/133; 156/143; 156/429
(58) Field of Search .................... 138/133, 172, 138/174, 127, 130, 153; 156/143, 429

(56) References Cited

U.S. PATENT DOCUMENTS

| | | | |
|---|---|---|---|
| 3,242,691 | * 3/1966 | Robinson et al. | ............... 138/133 X |
| 4,167,953 | * 9/1979 | Carlstrom | ............................. 138/133 |
| 5,019,057 | * 5/1991 | Truckai | ............................. 138/133 X |
| 5,176,660 | * 1/1993 | Truckai | ............................. 138/133 X |
| 5,526,849 | * 6/1996 | Gray | ....................................... 138/133 |
| 5,611,374 | * 3/1997 | Blin et al. | ......................... 138/133 X |
| 5,765,599 | * 6/1998 | Hernvall et al. | .................. 138/174 X |

* cited by examiner

*Primary Examiner*—Patrick Brinson
(74) *Attorney, Agent, or Firm*—Arent Fox Kintner Plotkin & Kahn, PLLC

(57) ABSTRACT

A method for fabricating the composite plastic pipe with netted wire skeleton is disclosed, which comprises steps: forming cylindrical netted wire skeleton by winding the two groups of left and right coiled steel wire each other inside and outside alternatively; filling melted plastic on both sides of the cylindrical netted wire skeleton to make the melted plastic uniformly filled in skeleton as well as both sides thereof; cooling the skeleton-plastic composite in a fixed shape to obtain desire composite plastic pipe with netted wire skeleton. Since no welding is required, the process is simplified, resulting in simple manufacturing apparatus and reduction of cost.

8 Claims, 4 Drawing Sheets

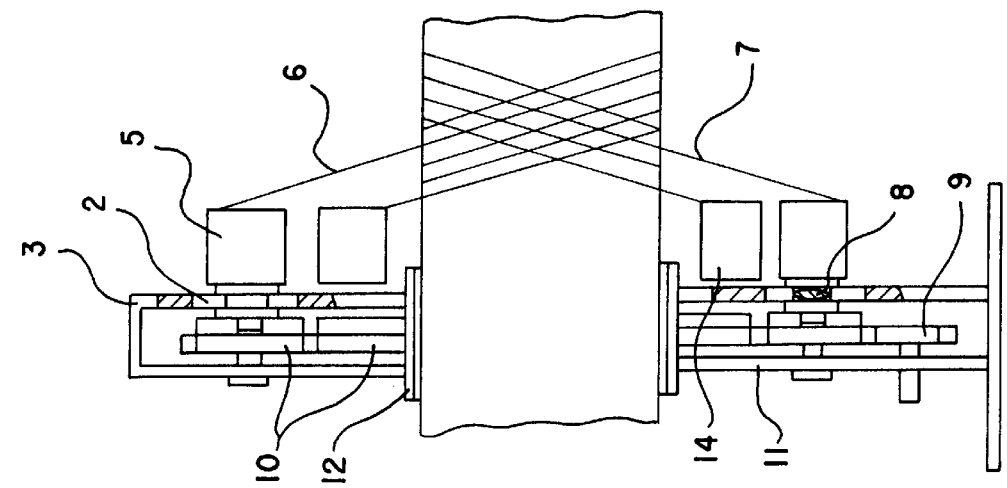
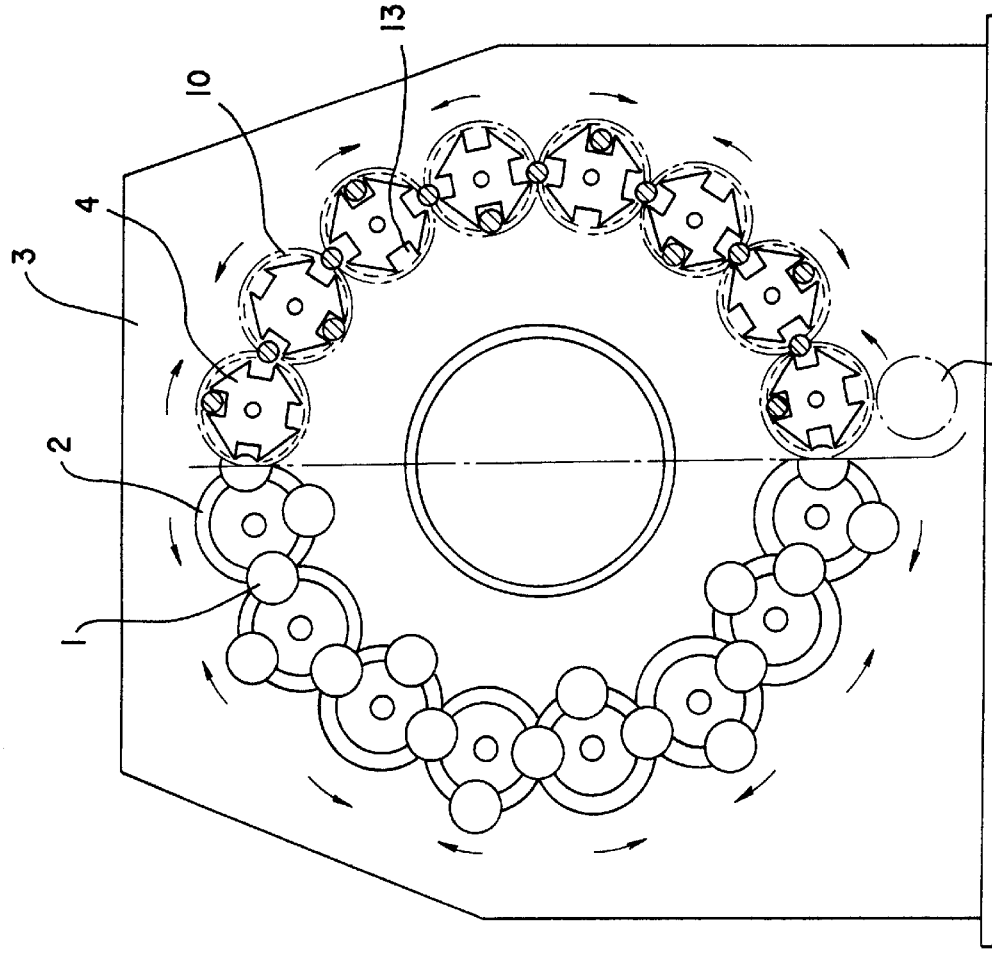

1

COMPOSITE PLASTIC PIPE WITH NETTED STEEL WIRE SKELETON AND METHOD AND DEVICE FOR FABRICATING THE SAME

FIELD OF THE INVENTION

The present invention relates generally to a composite plastic pipe, the method and apparatus for fabricating the same, particularly to an improved composite plastic pipe with netted steel wire skeleton, as well as method and apparatus for fabricating the same.

BACKGROUND OF THE INVENTION

Plastic pipes are widely used in various engineering fields. For its advantages of no contamination of carried media, resistance to corrosion, light in weight, and convenience in transportation and installation, the prospect of the application thereof is becoming even more brilliant.

However, the conventional plastic pipe is restricted in some industrial fields due to its poor performance in mechanic strength, rigidity and heat resistance. So far, many forms of composite steel-plastic pipes, as well as the manufacturing methods and devices, have been proposed, in order to improve the mechanic strength, rigidity and heat resistance of plastic pipes to be applied to the fields with higher pressure. For example, U.S. Pat. No. 3, 526, 692 granted to Osaka, U.S. Pat. No. 4, 657, 049 to Forty et al. and U.S. Pat. No. 4, 167, 953 to Carlstrom et al. have disclosed methods for fabricating reinforced plastic pipes with spiral steel wires to improve the strength thereof. The apparatus for manufacturing reinforced plastic composite pipes has been provided by U.S. Pat. No. 4, 017, 232(Holden et al.) and U.S. Pat. No. 4, 135, 869 (Loyer et al.).

The method for fabricating the conventional composite plastic pipes is, as disclosed by U.S. Pat. No. 3, 526, 692, comprises the following steps: forming a spiral steel wire; inserting the spiral steel wire into a plastic extrusion mold in the direction of the axis; forming a plastic pipe body in mold so that the spiral steel wire is embedded in the plastic pipe body and protruded outwardly from the outer surface of the plastic pipe body; and putting the resulted structure through a second extrusion mold so that a plastic layer is adhered to the periphery of the plastic body to cover the protruding spiral steel wire. There are two drawbacks in this method. Firstly, the process is complicated, since twice extrusions of plastic have to be performed to get a desired product. Secondly, What is embedded in the plastic pipe is a spiral steel wire. Although the measure has reinforced the plastic pipe to a certain extent, the effect is not satisfactory.

The Chinese patent ZL94104509.9 held by the inventor of the present invention provides another method and device for fabricating a netted steel wire skeleton—composite plastic pipe, which has overcome the drawbacks of insufficient strength and complicated process in the prior art. The commercialized product has been obtained by the patented method. The compressive strength of the product is from 1 to 6.5 Mpa. This patent is incorporated herein as reference.

The inventor has discovered on the basis of study that the composite netted steel wire skeleton—plastic pipe made according to the Chinese patent ZL94104509. 9 have also some shortcomings, though it is obviously superior to other similar products. The netted steel wire skeleton, according to the patent, is configured by intersecting longitude lines and latitude lines. Both take 50% respectively. As matter of fact, the longitudes have little effect in bearing interior pressure or reinforcing rigidity. The effect for increasing strength by steel wire skeleton has been reduced by about one third. In the other hand, since longitudes have almost nothing to do with bearing interior pressure, the diameter of the latitudes has to be increased to enhance the strength of the pipes. Large diameter latitudes result in inevitably a thicker pipe wall, thus increasing the production cost. Moreover, the purpose of welding is to secure the two groups of steel wires to form a netted skeleton. This results in he manufacturing device with a complicated structure, great dimension, and large energy consumption.

SUMMARY OF THE INVENTION

The object of the present invention is, on the basis of preserving the advantages of the composite plastic pipe with the netted wire skeleton and to overcome the drawbacks in the prior art, to provide a composite plastic pipe by a simply process, which can conveniently and rapidly fill plastic into the skeleton, so as to increase the utilization of the steel wires and reduce the cost. The method can meet the requirements of automatic production of the composite plastic pipe with netted wire skeleton.

An another object of the present invention is to provide a composite plastic pipe with netted steel wire skeleton with an improved structure.

A further object of the present invention is to provide a method for fabricating a composite plastic pipe with netted steel wire skeleton. A still further object of the present invention is to provide an apparatus for fabricating a composite plastic pipe with netted steel wire skeleton.

To achieve above objects, the netted steel wire skeleton in the composite plastic pipe, according to the present invention, is a cylindrical steel wire netting, comprising a group of left coiled wires and a group of right ones. Each includes a plurality of wires respectively. The two groups of left and right coiled wires are winded inside and outside alternatively each other to form the netted skeleton. The spiral angle of the coiled wires can be varied within a certain range to meet the desired diameter and/or strength of the composite plastic pipe.

To achieve above objects, the present invention also provides a method for fabricating the composite plastic pipe with the netted wire skeleton. The method comprises the following steps: forming cylindrical netted wire skeleton by winding the two groups of left and right coiled steel wires each other inside and outside alternatively; filling melted plastic on both sides of the cylindrical netted wire skeleton to make the melted plastic uniformly filled in skeleton as well as both sides thereof; and cooling the skeleton-plastic composite in a fix shape to obtain desired composite plastic pipe with netted steel wire skeleton. The method can be carried out continuously and automatically. The cylindrical netted wire skeleton is obtained by the following manner. Firstly, two groups of wire coiled reels move in reverse direction along two tracks, which are similar to sinusoidal curve (hereafter called sinusoid tracks) and distributed evenly according to a circle. One sinusoid track is of opposite phase to another. The reels will exchange their positions outside and inside alternatively once they reach the intersection of the two tracks so as to realize simultaneous winding and netting.

In other words, the cylindrical netted wire skeleton is formed according to the following method. A plurality of mutually engaged gears with the same modules and the same teeth' number are distributed evenly along a circle. These gears are rotating at the same rate in reversed direction. The movements of two groups of left and right coiled wire reels are driven along the two tracks. Once the reels reach the intersection of the two tracks, they will exchange their position outside and inside alternatively. The left and right coiled wires will be netted around the axis to form the skeleton.

The present invention also provides a device for fabricating the composite plastic pipe with netted wire skeleton. The device includes a netting means for forming the cylindrical netted wire skeleton; a extruding means for extruding the molten plastic; a pipe-molding chamber and a cooling jacket for fill uniformly the molten plastic into the netted skeleton and both sides of the skeleton, and cooling the result structure to be fix shape; and a drawer for pulling the skeleton out of the netting means and pulling the final product out of the above described device. The netting means is positioned upstream of the pipe-molding chamber and the cooling jacket. Said netting means includes a main shaft, two groups of left and right coiled steel wire reels with axis parallel to the one of said main shaft; a chute plate, on which two sinusoidal chute are placed uniformly on a circle, the center of the circle is coaxial with the center of the circle on which the gears are distributed; and a means for rotating said reels along the two sinusoids chutes on said chute plate in reverse directions.

Said means for rotating includes a fixed base plate perpendicular to the axis of the main shaft; a plurality of gears with equal module and equal number of teeth provided on the fixed base plate; these gears being distributed evenly on a circle coaxial to said main axis and mutually engage successively, one or more driving block with a plurality of flutes on each gear, the axis of said reel is inserted into said flute; the movement track of the center of the flute is coincident with the chute on said chute plate.

Each reel is provided with a boat-shaped slider for steering.

On the fixed base plate according to the present invention, a plurality of mutually engaged gears with the same modules and teeth' number are distributed evenly along a circle with the center fixed to said main axis when the driving gear rotates, those gears rotate successively in reverse directions at the same rate. There is a driving block with four flutes on each gear. The flutes are perpendicular to the gear and allow said axis of said reel to be inserted. Each driving block can drive one or two wire reel simultaneously. As the gears rotate, the flutes push those wire reels to rotate simultaneously.

In front of the driving block, the fix chute plate with chutes is disposed. The chutes are sinusoidal distribution along a circle. The center of the circle is coincident with the center of the circle around which the gears are disposed. The sinusoidal curve is the move track of the center of the driving block flute. As the gears rotate, the two groups of wire reels slide on the chutes of the chute plate, and rotate simultaneously in reverse directions along the its own sinusoidal track, respectively. Whenever as the gears rotate to a certain angle and the reels reach the intersection of the two tracks, the two groups of steel wire reels exchange their positions from outside to inside once. So, the purpose of winding and netting simultaneously to form the skeleton can be achieved.

Compared to the prior art, the skeleton of the present invention requires no welding. The process of the fabrication is simplified, resulting in a simpler netting apparatus and a reduced production cost. Moreover, since the present invention adopts a netted steel wire skeleton, the filling of plastic has become convenient and easy for automatic production in a continuous way.

Other advantages and features of the present invention will become more apparent on the basis of the following the detailed description of the preferred embodiment of the present invention with reference to the accompanying drawings.

BRIEF DESCRIPTION OF THE DRAWINGS

FIG. 3 is structure principle diagram of the netting means according to the present invention, wherein the front view of the netting means is on the right and the view of right on the left.

DETAILED DESCRIPTION OF THE PREFERRED EMBODIMENT

Figure 1:
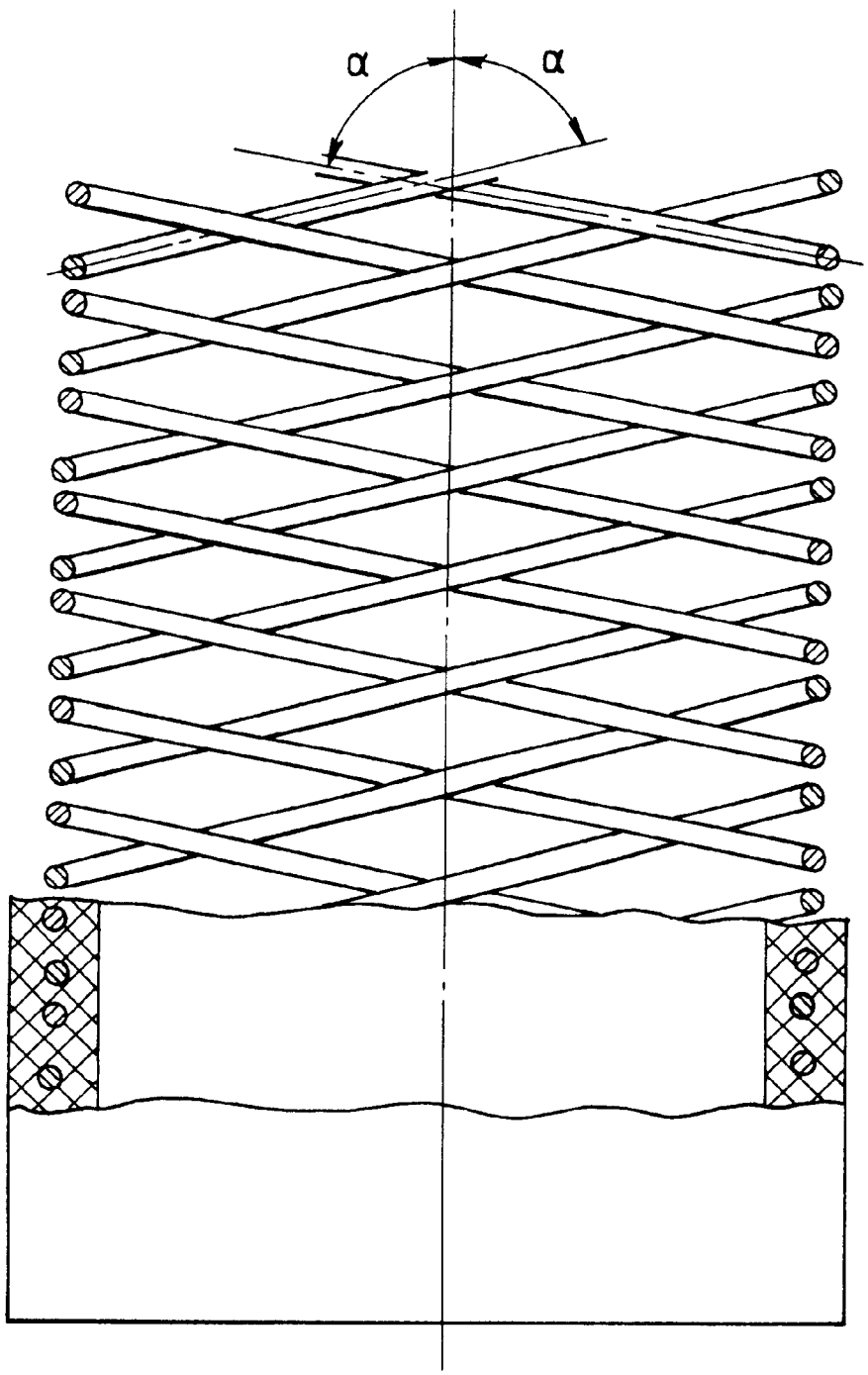
FIG. 1 is the structure of the composite plastic pipe with the netted wire skeleton pipe according to the present invention.

As shown in FIG. 1, the structure of the composite plastic pipe according to the present invention includes a cylindrical netted steel wire skeleton embedded in a plastic pipe. The netted wire skeleton is composed of a group of left coiled wire and a group of right one, which are winded outside and inside alternatively each other to form the skeleton. As shown in the FIG. 1, the winding spiral angle is $\alpha$. The angle $\alpha$ can be adjusted according to the diameter of the pipe and desired strength thereof. Furthermore, the number of the wires in the two groups of left and right coiled steel wires are selected depending upon diameter of the pipe and desired strength of the pipe. The smaller is the diameter, or the lower the strength is the pipe desire, the less number of the wires is to be selected, and vice verse.

Figure 2:
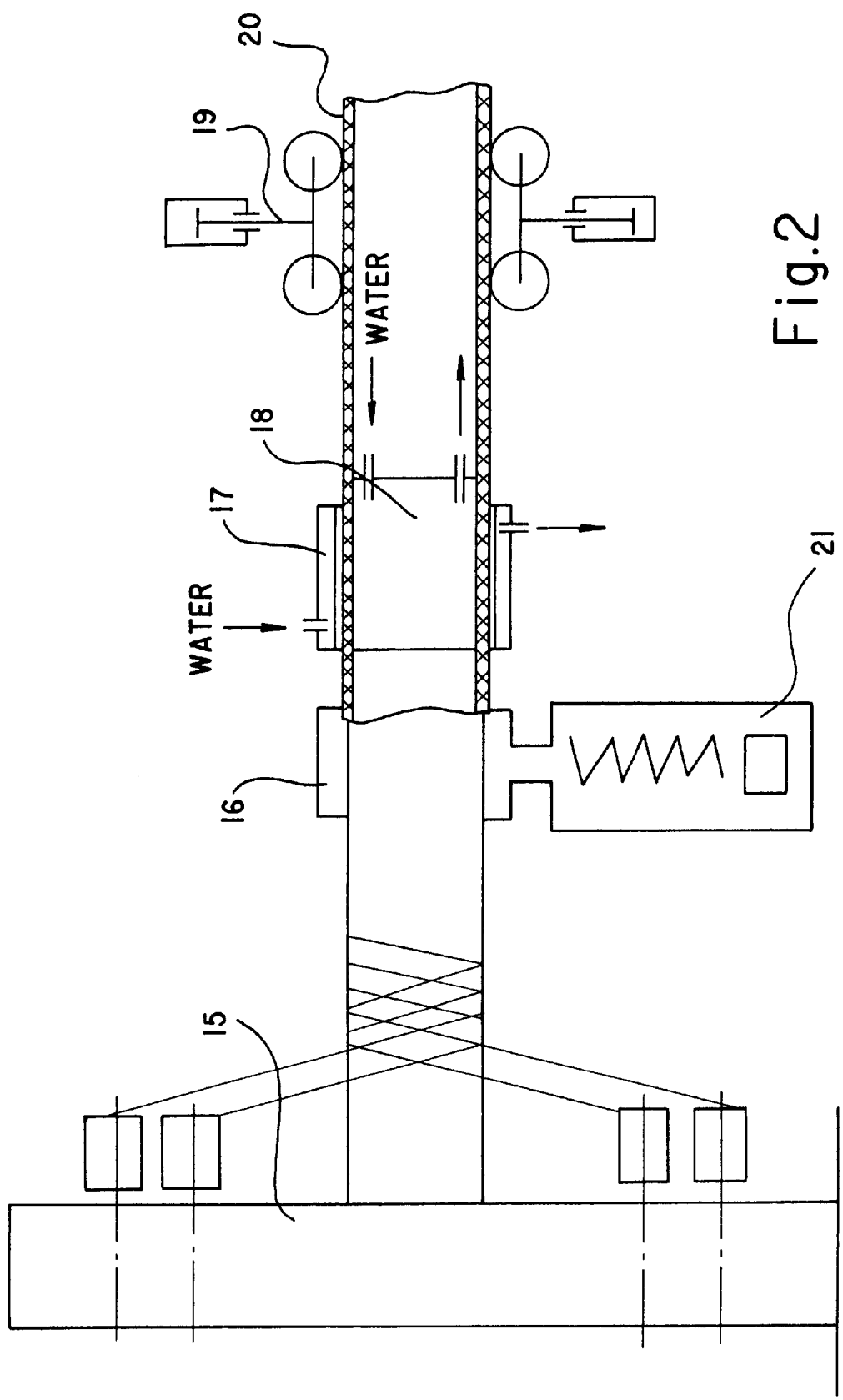
FIG. 2 is a diagrammatic illustration of the device for fabricating the composite plastic pipe with the netted wire skeleton according to the present invention.

FIG. 2 shows the device according to the present invention for forming the composite plastic pipe 20 with the structure shown in FIG. 1. The device comprises a netting means 15, a extruding means 21, a pipemolding-chamber 16, an interior cooling jacket 18, an exterior cooling jacket 17 and a drawer 19. The netting means is located on the upstream of the pipe-molding chamber 16.

The procedure of fabricating the composite plastic pipe by means of the apparatus according to the present invention is described with reference to FIG. 2. First, a cylindrical netted steel wire skeleton is formed on the netting means 15. The drawer 19 pulls the cylindrical skeleton continuously into the pipe-molding chamber 16. A kind of thermoplastic plastic is molten in the extruding means 21. Then, the extruding means extrudes the molten plastic into the pipe-molding forming chamber 16, wherein the skeleton is positioned, to fill the molten thermoplastic plastic into the skeleton continuously, so that the molten thermoplastic plastic distributes evenly and uniformly the skeleton and on both sides thereof. The resulted structure is cooled in the interior and exterior cooling jackets 18 and 17 to fix the shape. The final product, netted wire skeleton, is pulled out of the device by the drawer and cut into sections with predetermined lengths. The above-described procedure can be a carried out continually.

The molten thermoplastic plastic can be extruded into the netted steel wire skeleton in outward or inward way, or formed by winding and rolling dependent upon different pipe diameter.

Figure 4B:
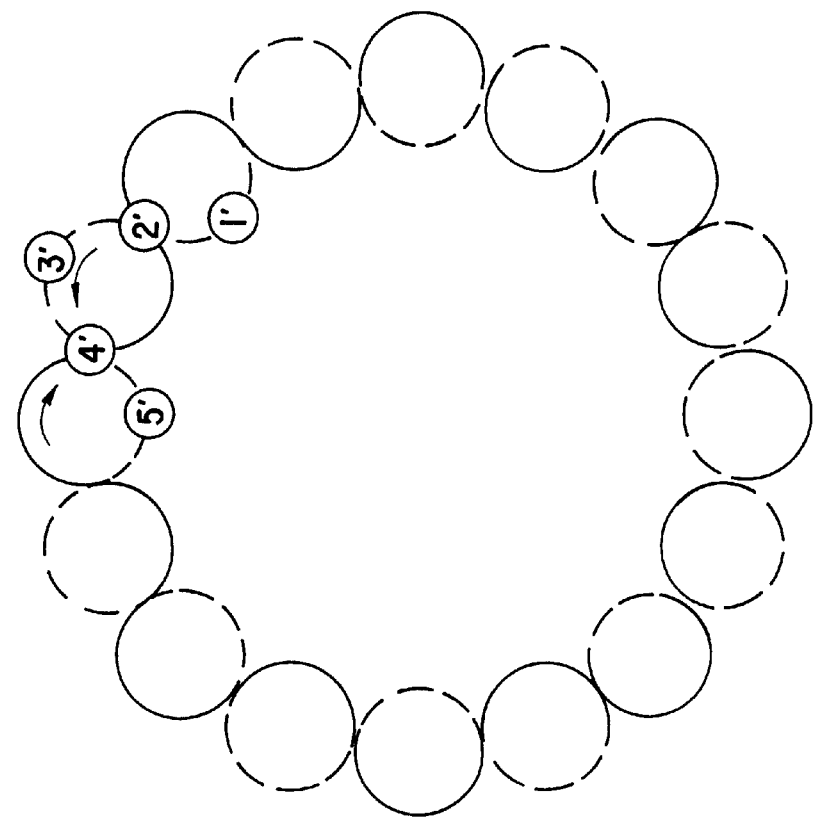
FIG. 4 is the moving tracks of the reels in the netting means according to the present invention.
Figure 4A:
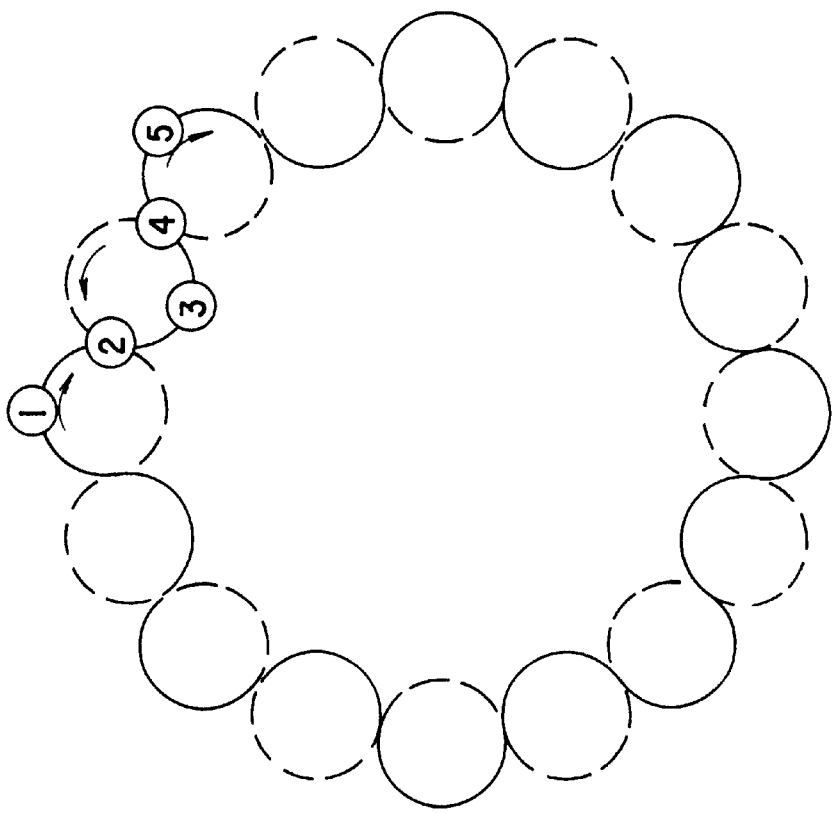

FIGS. 3 and 4 show the way to obtain the cylindrical netted wire skeleton by means of the netting means 15. As shown in FIG. 3, the netting means comprises a main shaft 12; two groups of left and right coiled steel wire reels with axis parallel to the one of said main shaft 5, 14; a chute plate 3, on which two sinusoidal chutes are placed uniformly on a circle, the center of the circle is coaxial with the center of the circle on which the gears are distributed; a fixed base plate 11 perpendicular to the center axis of the main shaft; a plurality of gears 10 with equal module and equal teeth' number provided on the fixed base plate. On the fixed base plate a plurality of mutually engaged gears with the same modules and teeth' number are distributed evenly along a circle, the center of the circle is coaxial to said main axis. As the driving gear rotated, those gears also rotate successively but in reverse directions at the same rate. There is a driving block 4 with four flutes 13 on each gear. The flutes 13 are perpendicular to the gear and allow said axis of said reel to be inserted. The movement track of the center of the flute 13 is coincident with the chute 2 on said chute plate 3. Each reel has a boat-shape slider 8 for guiding.

On the fixed base plate 11 of the device, a plurality of mutually engaged gears 10 with the same modules and teeth's number are distributed evenly on a circle. The center of the circle is coaxial to said main axis 12. Each gear is equipped a driving block 4 with four symmetrical flutes 13. The flutes 13 allow axis of reel 5 and 14 to be inserted. As the driving gear 9 rotates, those gears 10 rotate successively but in reverse directions at the same rate.

In front of the gear 10 and a driving block 4 there is a fixed chute plate 3, whereon two sinusoidal chutes 2 are set along a circle. The center of the circle is coincident with the center of the circle on which the gears are distributed. The sinusoidal curve chutes 2 is the move track of the center of the driving block flute. As the gears 10 rotate, the two groups of left and right wire reels 5 and 14, slide on the chutes 2, respectively, and at the same time rotate in reverse directions along its own track 1'-2'-3'4'-5' or track 1-2-3-4-5, as shown in FIG. 4. When the reels rotate to a certain angle (which depends on the number of the reels, for instance, the number is 2, the angle would be 90 degree), the two reels exchange their position up and down once, for realizing the aim of winding and netting simultaneously into a skeleton.

To ensure that the two reels exchange their positions up and down at said point where the two sinusoidal curves intersect, namely to ensure that the reels move on the predetermined track, a boat-shaped slider 8 for guiding purpose is arranged on each wire reel.

Although a detailed description of one embodiment has been given, the present invention is not limited to this embodiment. All modifications and substitutions within the spirit and the objects of the present invention shall fall into the scope of protection as claimed.

What I claim is:

1. A method for fabricating the composite plastic pipe with netted wire skeleton, comprising following steps:

forming cylindrical netted wire skeleton by winding the two groups of left and right coiled steel wire each other inside and outside alternatively;

filling melted plastic on both sides of the cylindrical netted wire skeleton to make the melted plastic uniformly filled in skeleton as well as both sides thereof; and cooling the skeleton-plastic composite in a fixed shape to obtain desired composite plastic pipe with netted wire skeleton.

2. The method for fabricating the composite plastic pipe with netted wire skeleton according to claim 1, further comprising the following steps:

moving two groups of wire coiled reels in reverse direction along two tracks which are similar to sinusoidal curve (hereafter called sinusoid tracks) and distributed evenly according to a circle;

arranging the phase of one sinusoid track being opposite to that of another track;

exchanging the positions of the reels outside and inside alternatively whenever they reach the intersection of the two tracks so as to realize simultaneous winding and netting.

3. The method for fabricating the Composite plastic pipe with netted wire skeleton according to claim 1 further comprising the following steps:

distributing a plurality of mutually engaged gears with the same modules and the same teeth' number evenly along a circle;

rotating these gears at the same rate in reversed direction;

driving the two groups of left and right coiled wire reels to move along the two tracks;

exchanging the positions of the reels outside and inside alternatively whenever the reels reach the intersection of the two tracks;

netting the left and right coiled wires around the axis to form the skeleton.

4. The method for fabricating the composite plastic pipe with netted wire skeleton according to claim 1, wherein the number of the wires and the spiral anger may be changed according to the desire diameter of pipe and strength of the pipe.

5. A device for fabricating the composite plastic pipe with netted wire skeleton, comprising:

a netting means for forming the cylindrical netted wire skeleton;

an extruding means for extruding the molten plastic;

a pipe-molding chamber and a cooling jacket for filling uniformly the molten plastic into the netted skeleton and both sides of the skeleton, and cooling the result structure to be fix shape; and a drawer for pulling the skeleton out of the netting means and pulling the final product out of the above described device;

wherein the netting means is positioned at the upstream of the a pipe-molding chamber and a cooling jacket.

6. The device for fabricating the composite plastic pipe with the netted wire skeleton according to claim 5, wherein said netting means includes a main shaft, two groups of left and right coiled steel wire reels with axis parallel to the one of said main shaft; a chute plate, on which two sinusoidal chutes are placed uniformly on a circle which is coaxial with another circle on which the gears are distributed; and a means for rotating said reels along the two sinusoids chutes on said chute plate in reverse directions.

7. The device for fabricating the plastic pipe with the netted wire skeleton according to claim 6, wherein said means for rotating includes a fixed base plate perpendicular to the axis of the main shaft; a plurality of gears with equal module and equal number of teeth provided on the fixed base plate; these gears are distributed evenly on a circle coaxial with said main axis and mutually engage successively, one or more driving block with a plurality of flutes on each gear, the axis of said reel is inserted into said flute; the movement track of the center of the flute is coincident with the chute on said chute plate.

8. The device for fabricating the plastic pipe with the netted wire skeleton according to claim 6, wherein each reel is provided with a boat-shaped slider for steering.

* * * * *